United States Patent [19]
Mori

[11] 3,807,879
[45] Apr. 30, 1974

[54] PHOTOMETER COMPRISING QUANTIZED INDICATION ARRANGEMENT
[75] Inventor: Chiharu Mori, Tokyo, Japan
[73] Assignee: Asahi Kagaku Kogyo Kabushiki Kaisha, Tokyo-to, Japan
[22] Filed: Sept. 18, 1972
[21] Appl. No.: 289,983

Related U.S. Application Data
[63] Continuation-in-part of Ser. No. 286,988, Sept. 7, 1972.

[30] Foreign Application Priority Data
Sept. 11, 1971 Japan.............................. 46-70510

[52] U.S. Cl............................. 356/226, 250/214 P
[51] Int. Cl.......................... G01j 1/44, H01j 39/12
[58] Field of Search.................. 356/226; 250/214 P; 340/347 AD

[56] References Cited
UNITED STATES PATENTS
3,584,962 6/1971 Irwin................................. 356/226
3,603,799 7/1971 Nobusawa...................... 250/214 P Primary Examiner—Archie R. Borchelt
Assistant Examiner—T. N. Grigsby
Attorney, Agent, or Firm—Christie, Parker & Hale

[57] ABSTRACT
A quantized indicating unit has a circuit path for current flow. A controllable constant current source is connected in the circuit path for current flow and has a control circuit. The current source is characterized in that bias signals at the control circuit varies the amount of current flowing therethrough. A controllable variable impedance is coupled as a load circuit in the circuit path for current flow. A bias establishing circuit is provided for the control circuit and includes a plurality of impedances and means are provided for selectively coupling any one of the impedances to the control circuit, thereby establishing the bias on the control circuit. Scanning circuitry repeatedly and sequentially scans through a sequence of states. The coupling means responds to each different one of the states for coupling at least one different impedance to the control circuit, thereby causing for each of the states a different bias signal on the control circuit and a signal on the variable impedance corresponding to the amount of current flowing through the variable impedance. A source of a reference signal is provided together with a comparing circuit for comparing the signal with the reference signal. An indicating element is provided for each of the impedances and means are provided for coupling to the scanning circuit and the comparing circuit and is operative in synchronism with the scanning of the scanning circuit for responding to each correspondence detected by the comparing circuit for switching an indicating element into an indicating condition which indicating element corresponds to the impedance that is coupled to the control circuit at the detected correspondence.

9 Claims, 6 Drawing Figures

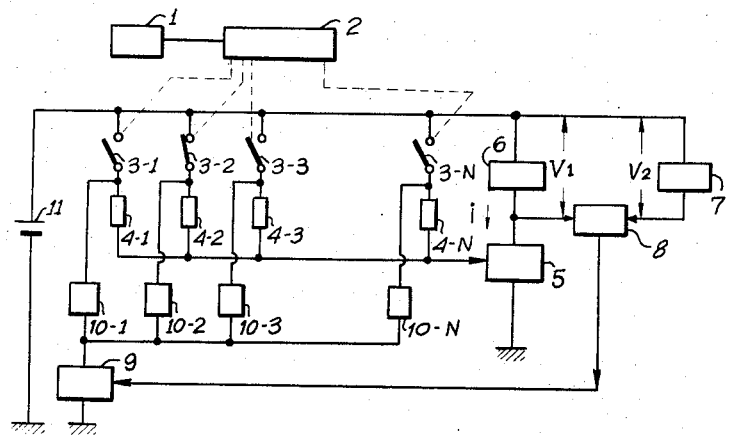
FIG - 1
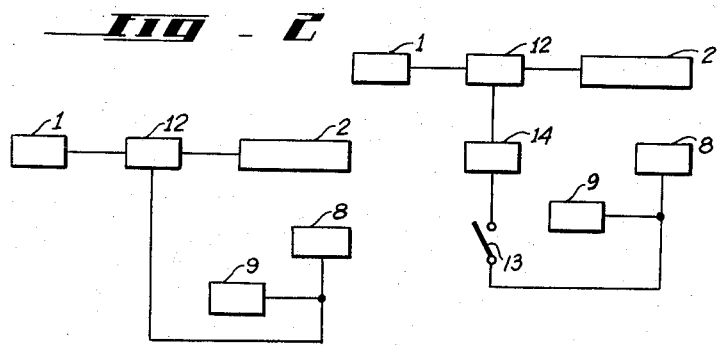
FIG - 2
FIG - 3
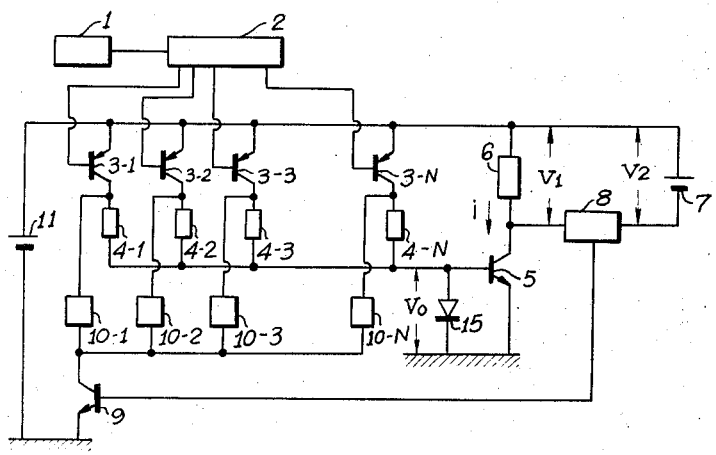
FIG - 4

PHOTOMETER COMPRISING QUANTIZED INDICATION ARRANGEMENT

CROSS-REFERENCE TO RELATED APPLICATIONS

This patent application is a continuation-in-part of the U.S. Pat. application Ser. No. 286,988 entitled "Quantized Indication Arrangement" filed Sept. 7, 1972 in the name of Chiharu Mori claiming priority of Japanese Pat. application No. 1971-70,510, filed Sept. 11, 1971. The subject matter of the disclosure in the prior filed patent application "Quantized Indication Arrangement" is hereby incorporated by reference herein.

BACKGROUND OF THE INVENTION

The present invention relates to an arrangement for quantization of light measurement values and, more particularly, to arrangements for quantization of light measurement values in electric exposure meters or cameras provided with electrically controlled shutters.

Light measurement values in electric exposure meters or cameras with electrically controlled shutters have been indicated generally in analog manner by means of ammeters. This method is, however, undesirable because mechanical troubles are liable to occur, reading of the scale is difficult under lowly illuminated condition and it has been hard to eliminate such disadvantages. As a countermeasure to such disadvantages, quantized indication methods have been proposed in which the input signal is transformed into a number of pulses which are counted by multi-stage pulse counters and the resulting counted number is memorized and indicated, or alternatively simultaneous comparison of the input signals is carried out with previously provided multi-step threshold voltage values. The latter mentioned method is known as the parallel process quantizing method. In practical embodiments of such ideas, however, the circuits are very complicated with greatly increased circuit elements. Further, with respect to reliability and cost, these embodiments are not necessarily of practical advantage.

SUMMARY OF THE INVENTION

An embodiment of the present invention involves a novel means for eliminating the above-mentioned drawbacks in the quantized indication method according to the prior art. A quantized indicating unit embodying the present invention includes a circuit path for current flow having therein current control means connected in the circuit path for current flow. The current control means is characterized in that it has first and second inputs for controlling the amount of current flowing therethrough. A plurality of impedance means are provided together with means for selectively coupling any one of the impedance means to a first one of the inputs, thereby establishing a first control for current flow through the current control means. Means is provided for repeatedly and sequentially scanning through a sequence of states. The coupling means responds to each different one of the states for coupling at least one different impedance means to the first input, thereby causing for each of the states a different control for current flow through the current control means and a different signal in the circuit path corresponding to the amount of current flowing therethrough. A source of a reference signal is provided, together with means for comparing the signal with the reference signal. An indicating element is provided for each of the impedance means and means is coupled to the scanning means and comparing means and is operative in synchronism with the scanning of the scanning means for responding to each correspondence detected by the comparing means for switching an indicating element into an indicating condition which indicating element corresponds to the impedance means that is coupled to the first input. The current control means comprises a photo-sensitive circuit element for varying the amount of current passing therethrough.

The greatest feature of the quantized indication arrangement according to the present invention is that the structure is very simple and accordingly, quantized indication can be accomplished with a small number of circuit elements. With the generally adopted conventional quantization system of this type called "pulse count system," the stability of clock pulse frequency exerts a great influence on the stability of the quantized indication arrangement so that stability of frequency is strongly desired. With the quantized indication arrangement according to the present invention, the stability of clock pulse frequency is in principle independent of the stability of the quantized indication arrangement. Therefore, advantageously, according to the present invention, quantized indication arrangements of very high stability can be produced with very simple circuit structure and low cost.

BRIEF DESCRIPTION OF THE DRAWINGS

FIG. 1 is a diagram showing the fundamental structure of a quantized indication arrangement embodying the present invention;

FIGS. 2 and 3 are block diagrams showing portions of the quantized indicating arrangement of FIG. 1 together with additional circuit elements for giving additional functions to the fundamental structure of FIG. 1;

FIG. 4 is a diagram of one example of the present invention where an electric exposure meter is provided with the quantized indication arrangement according to the present invention.

DESCRIPTION OF THE PREFERRED EMBODIMENT

Figure 5:
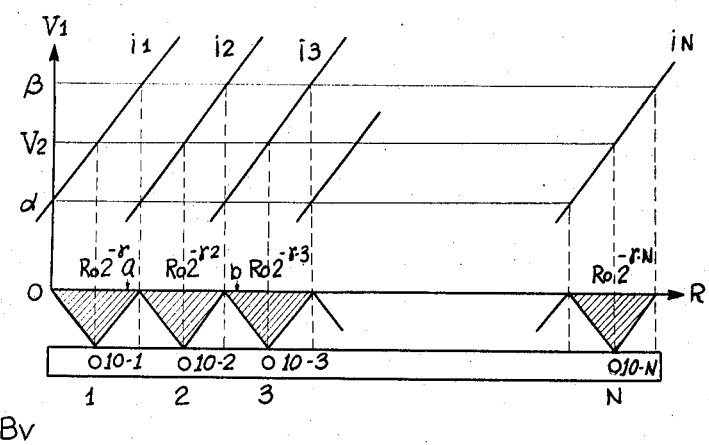
FIGS. 5 and 6 are graphs illustrating the function of quantized indication according to the present invention.

Referring now to the drawings, a detailed description of the quantized indication arrangement according to the present invention will now be given.

FIG. 1 shows the fundamental structure according to the present invention. There are shown a clock pulse generator 1; a scanning means or distributor 2, such as a ring counter for driving scanning switches in sequence in response to input pulses; scanning switches 3-1, 3-2, ..., 3-N; bias establishing elements 4-1, 4-2, ..., 4-N, such as resistors, for determining the current value of the constant-current circuit on the basis of the quantization level, the scanning switches and the bias establishing elements being N in number where N corresponds to the sampling number for quantization; a constant current circuit 5 whose current value is determined by means of the bias establishing elements 4-1, 4-2, . . . , 4-N; a variable resistor 6, such as a photoconductive element, whose internal resistance is determined in response to the input signal to be quantized; a reference voltage source 7; a coincidence circuit 8 which produces an output signal when two input voltages coincide with each other within a certain tolerance range so as to control the open-close operation of a gate circuit 9; the gate circuit 9; indicating elements 10-1, 10-2, . . . , 10-N, such as light emission diodes or lamps, which are N in number; and a power source 11.

The scanning switches 3-1, 3-2, . . . , 3-N are scanned in sequence by the distributor 2 responsive to the clock pulses generated by the clock pulse generator 1. The current i through the constant current circuit 5 is determined by the bias establishing elements 4-1, 4-2, . . . , 4-N whose value is determined on the basis of the quantization level. The constant current circuit 5 is serially connected to the variable resistor 6 as a load whose internal resistance value is determined in response to the input signal for quantization. The series circuit connection of the variable resistor 6 and the constant current circuit 5 are connected across the output of the power source 11. Accordingly, the value i of the current flowing through the variable resistor 6 varies time sequentially on the basis of the quantization level established by the bias establishing elements 4-1, 4-2, . . . , 4-N.

To the coincidence circuit 8 are applied the voltage drop $V_1$ which is determined by the current $i$ flowing through the value R of the variable resistor 6 and the reference voltage value $V_2$ of the reference voltage source 7. When the values $V_1$ and $V_2$ coincide with each other within a certain tolerance range, the coincidence circuit 8 applies an output signal to the gate circuit 9 causing it to open and allow current flow through the indicating elements 10-1, 10-2, . . . , 10-N. The indicating elements 10-1, 10-2, . . . , 10-N are connected through the scanning switches to the gate circuit 9 so that current is supplied to the indicating elements corresponding to the respective quantization level selected by the output of the coincidence circuit 8. As a result, the corresponding indicating element is lighted. It should be noted that the lighting time duration and repetition period are determined by the clock pulse frequency and the number of sampling.

The embodiment of the invention shown in FIG. 2 is a part of the whole structure shown in FIG. 1 with parts removed for simplicity. FIG. 2 shows an embodiment of the invention wherein a gate circuit 12 or disabling means is inserted between the clock pulse generator 1 and the distributor 2. The action of the gate circuit 12 is controlled by the output signal of the coincidence circuit 8. The gate circuit 12 is a normally open type enabling pulses from the clock pulse generator 1 to normally pass therethrough to the distributor 2. Other circuits and their operations are the same as those of FIG. 1. In operation, an output signal from the coincidence circuit 8 causes the gate circuit 9 to be opened and the gate circuit 12 to be closed so that the clock pulses to the distributor 2 are blocked and the condition of the distributor 2 at that moment is retained and accordingly the indicating element which is selected at that moment is kept lighted.

The embodiment of the invention shown in FIG. 3 is a part of the whole circuit shown in FIG. 1 with parts removed for simplicity. The embodiment of FIG. 3 shows the output from the coincidence circuit 8 applied to the gate circuit 12 through a normally closed type switch 13 and a memory circuit 14. Typically, the memory circuit is a flip-flop circuit. After quantizing indication is carried out in accordance with an input signal to be quantized, the switch 13 is opened, causing a signal to be stored in the memory circuit 14. Storage of a signal in the memory circuit 14 causes it to maintain energized the indicating element that was energized immediately before opening of the switch 13, independent of the existence or absence or variation of further applied input signals to be quantized. When the switch 13 is opened, the signal is removed from the memory circuit 14 and there is started again quantized indication in accordance with the input signals and the correspondingly specified indicating element is lighted.

Refer now to FIG. 4 where an embodiment of the invention in an electric exposure meter is disclosed.

In FIG. 4, the scanning switches 3-1, 3-2, . . . , 3-N are transistors, the constant current source is a transistor having its collector electrode connected to the variable resistor 6 and its emitter electrode connected to one side of the power source 11. Bias establishing elements 4-1, 4-2, . . . , 4-N are resistors. Gate circuit 9 is a transistor. Let the quantized indication of APEX-represented value $B_V$ of the object brightness B be: $B_V = 1, 2, \ldots, N$. If a photoconductive element such as CdS is used as the variable resistor 6 which is one of the fundamental elements of the quantized indication arrangement according to the present invention, then its internal resistance R is given by: $R = R_o 2^{-B_V^0 \gamma}$, where $R_o$ is the resistance value determined by the characteristic of the photoconductor element and the light measurement condition and $\gamma$ is the constant which is proper to the photoconductive element.

As one of the fundamental elements of the present invention, for obtaining the current $i$ of the constant current circuit, the constant current characteristic of the collector current voltage characteristic of the transistor 5 is utilized, thus obtaining $i$ as the collector current of the transistor 105. The so-called bias condition for determining the collector current $i$ of the transistor 5 is as follows: The clock pulses from generator 1 cause the output signals from the distributor 2 to selectively turn on transistors 3-1, 3-2, . . . , 3-N. Transistors 3-1, 3-2, . . . , 3-N act as scanning switches and select in sequence bias establishing resistors 4-1, 4-2, . . . , 4-N. By means of the values of such bias establishing resistors and the action of a diode 15 connected in series with them, the collector current $i$ of the transistor 5 is determined. Thus, the collector current $i$ of the transistor 105 is obtained with a value which is approximately inversely proportional to the value of the corresponding bias establishing resistor.

The valve $R_B$ of each of the N bias establishing resistors is determined according to the formula $R_B = R_{BO} 2^{-\gamma B}v$. The values $R_{B4-1}, R_{B4-2}, \ldots, R_{B4-N}$ of the bias establishing resistors 4-1, 4-2, . . . , 4-N, respectively, which are N in number corresponding to the number of sampling, are as follows: $R_{B4-1} = R_{BO} 2^{-\gamma}$, $R_{B4-2} = R_{BO} 2^{-\gamma \cdot 2}, \ldots, R_{B4-N} = R_{BO} 2^{-\gamma \cdot N}$. The resulting collector current $i$ of the transistor 5 is given by the formula:

$$i = k(E - V_D)/R_{BO} 2^{-\gamma \cdot BV},$$

where $R_{BO}$ is a resistance value determined suitably in circuit design, E is the voltage of the power source 11, $V_D$ is a voltage across the diode 15 and $k$ is a constant.

The internal resistance R of the variable resistor photoconductor element 6, is determined by the object brightness and the collector current $i$ of the transistor 5, which constitutes a constant current circuit determined by the bias establishing resistors 4-1, 4-2, ..., 4-N which are scanned in sequence and produce a voltage drop $V_1$ which is represented by a formula $V_1 = i^0 R$.

With respect to the coincidence circuit 8, the reference voltage $V_2$ of the reference voltage source 7 is established as follows:

$$V_2 = k(R_0/R_{B0})(E - V_D).$$

The threshold value is so established that when $V_2 - \alpha \leq V_1 < V_2 + \beta$ the coincidence circuit produces an output for opening the gate circuit that makes the transistor 9 conductive. $\alpha$ and $\beta$ are the tolerance range of object $B_V$ values for quantized indication on the basis of the internal resistance R of the photoconductor element. For example, if this tolerance range is $\pm 0.5 E_V$, then $V_2 - \alpha = V_2 \cdot 2^{-0.5}$, $V_2 + \beta = V_2 \cdot 2^{0.5}$. These relations are shown in FIG. 5, in which $i_1, i_2, \ldots i_N$ are respective values of the collector current $i$ obtained corresponding to N bias establishing resistors 4-1, 4-2, ..., 4-N provided for corresponding quantization levels and are respectively given by: $i_1 = k(E - V_D)/R_{B0} 2^{-\gamma \cdot 1}$, $i_2 = k(E - V_D)/R_{B0} 2^{-\gamma \cdot 2}, \ldots, i_N = k(E - V_D)/R_{B0} 2^{-\gamma \cdot N}$. In FIG. 5, there are shown indicating elements 10-1, 10-2, ..., 10-N corresponding respectively to quantized indication values of object brightness $B_V = 1, 2, \ldots, N$ due to the internal resistance R of the photoconductor element determined by the object brightness. The respective R indication ranges of the indicating elements are shown by hatched inverted triangles with their apexes coinciding with the indicating elements. For example, if R is of a value indicated by the arrow $a$, the indicating element $B_V = 1$ is lighted, and if R is of a value indicated by the arrow $b$, the indicating element $B_V = 3$ is lighted.

Figure 6:
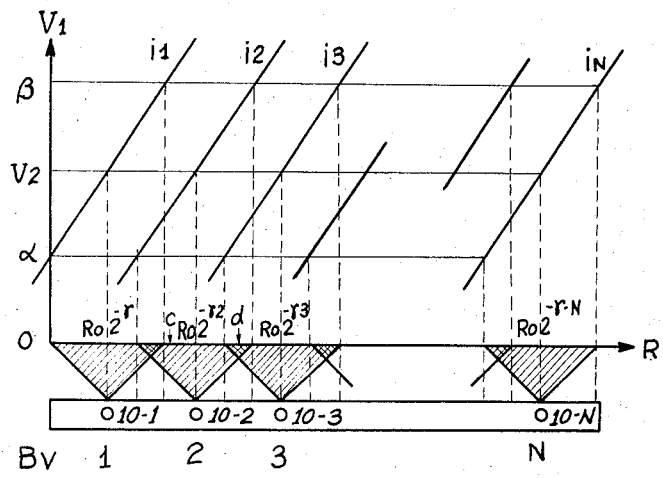

With the quantized indication arrangement according to the present invention, the number of sampling can be equivalently increased by establishing proper values of $\alpha$ and $\beta$ and without increasing the number of elements (circuit elements). This will be described in conjunction with one example as shown in FIG. 6. The above mentioned object can be attained by so establishing the values of $\alpha$ and $\beta$ that the R ranges of neighboring $B_V$ values partly overlap each other. With respect to such overlapped R range as shown by an inverted triangle which is hatched in left-side-up to right-side-down direction, the both indicating elements belonging to this R range are time-sequentially lighted on the basis of the period of clock pulses. For example, if R is of the value as indicated by the arrow C, the indicating element $B_V = 2$ is lighted, while if R is of the value as indicated by the arrow $d$, the indicating elements $B_V = 2$ and $B_V = 3$ are time-sequentially lighted on the basis of the period of clock pulses. In practice, if the clock pulse frequency is properly selected in view of the response characteristic of human eye, then it appears as if the indicating elements $B_V = 2$ and $B_V = 3$ are lighted at the same time. Thus, introducing different indicating modes of single lighting of one indicating element and double lighting (which can be substantially regarded as simultaneous lighting) of two neighboring indicating elements, it is possible to increase the number of sampling for quantized indication.

The quantized indication arrangement according to the present invention has been described above in conjunction with one example in which application is made to quantized indication of the light measurement values in electric exposure meters, that is, $B_V$ values. It is clear that the quantized indication arrangement according to the present invention can be generally applied to similar objects by transforming various continuous physical amounts into corresponding resistance values and making such arrangement that the value of the current flowing through the resistors is kept constant independent of variation of the resistance value.

What is claimed is:

1. A quantized indicating unit comprising:
   a circuit path for current flow having therein variable current control means connected in said circuit path for current flow, the current control means being characterized in that it has a first input for controlling the amount of current flowing therethrough, said variable current control means comprising, in said circuit path, a photo-sensitive circuit element for varying the amount of current passing therethrough;
   a plurality of impedance means;
   means for selectively coupling any one of said impedance means to said first input, thereby establishing a control for current flow through the current control means;
   means for repeatedly and sequentially scanning through a sequence of states, said coupling means responding to each different one of said states for coupling at least one different impedance means to said first input thereby causing for each of said states a different control for current flow through said current control means and a different signal in said circuit path corresponding to the amount of current flowing therethrough;
   a source of a reference signal;
   means for comparing said signal with said reference signal;
   an indicating element for each of said impedance means; and
   means coupled to said scanning means and comparing means and operative in synchronism with the scanning of said scanning means for responding to each correspondence detected by said comparing means for switching an indicating element into an indicating condition which indicating element corresponds to the impedance means that is coupled to said first input.

2. A quantized indicating unit according to claim 1 wherein said current control means comprises a controllable constant current element connected in series with said photo-sensitive circuit element for varying the amount of current passing through said circuit path responsive to the signal applied at said first input.

3. A quantized indicating unit comprising:
   a circuit path for current flow;
   a controllable constant current source connected in said circuit path for current flow and having a control circuit, the current source being characterized in that bias signals at said control circuit varies the amount of current flowing therethrough;
   a controllable variable impedance means coupled as a load circuit in said circuit path for current flow, said variable impedance means comprising a photo-sensitive circuit element for varying the amount of current passing therethrough;

a bias establishing circuit for said control circuit comprising:

a plurality of impedance means, and means for selectively coupling any one of said impedance means to said control circuit thereby establishing the bias on said control circuit;

means for repeatedly and sequentially scanning through a sequence of states, said coupling means responding to each different one of said states for coupling at least one different impedance means to said control circuit thereby causing for each of said states a different bias signal on said control circuit and a signal on said variable impedance means corresponding to the amount of current flowing through the variable impedance means;

a source of reference signal;

means for comparing said signal with said reference signal;

an indicating element for each of said impedance means; and means coupled to said scanning means and comparing means and operative in synchronism with the scanning of said scanning means for responding to each correspondence detected by said comparing means for switching an indicating element into an indicating condition which indicating element corresponds to the impedance means that is coupled to said control circuit at the detected correspondence.

4. A quantizing unit according to claim 3 comprising a source of potential and wherein said coupling means couples said impedance means between said source of potential and said bias circuit.

5. A quantizing unit according to claim 3 wherein said impedance means comprises at least one resistor.

6. A quantizing unit according to claim 3 wherein said scanning means comprises a source of clock pulses and multi-state circuit means responsive to said pulses for stepping from one state to the next through said series of states.

7. A quantizing unit according to claim 6 comprising disabling means coupled to said source of clock pulses and said comparing means for preventing application of the clock pulses to said circuit means responsive to said predetermined correspondence to thereby retain the corresponding indication of said indicating means.

8. A quantizing unit according to claim 7 wherein said disabling means coupled to said source of clock pulses and said comparing means comprises gate means coupled between said source of clock pulses and circuit means for switching said clock pulses from said circuit means.

9. A quantizing unit according to claim 7 comprising controllable switch means coupled to said comparing means and memory means coupled between said switch means and said disabling means, switching of said switching means to a first state causing said memory means to control said disabling means and thereby prevent application of said clock pulses to said circuit means and thereby retain the indication of an indicating means.

* * * * *

UNITED STATES PATENT OFFICE
CERTIFICATE OF CORRECTION

Patent No. 3,807,879  Dated April 30, 1974

Inventor(s) Chiharu Mori

It is certified that error appears in the above-identified patent and that said Letters Patent are hereby corrected as shown below:

On the cover sheet, line "[73]" presently reads "Kagaku" and should read -- Kogaku --.

In the specification:

Column 4, line 31, "$R = R_o 2^{-B_v 0}\gamma$" should read -- $R = R_o 2^{-Bv} \cdot \gamma$ --.

Column 4, line 55, "valve" should read -- value --.

Column 4, line 57, "$B_V$" should read -- $\cdot B_V$ --.

Column 4, line 65, "BV" should read -- $B_V$ --.

Column 5, line 9, "$i^0 R$" should read -- $i \cdot R$ --.

Column 5, line 15, "$k(R_0/R_{BO})$" should read -- $k\ R_0/R_{BO}$ --.

Signed and sealed this 12th day of November 1974.

(SEAL)
Attest:

McCOY M. GIBSON JR.
Attesting Officer

C. MARSHALL DANN
Commissioner of Patents